Patented Mar. 6, 1951

2,543,842

UNITED STATES PATENT OFFICE 2,543,842

POLYSULFONE RESIN PROCESS AND COMPOSITION

Frederick E. Frey, Bartlesville, Okla., assignor to Phillips Petroleum Company, a corporation of Delaware No Drawing. Application October 4, 1948, Serial No. 52,797

19 Claims. (Cl. 260—30.8)

This invention relates to the manufacture of polysulfone resins from olefinic compounds and sulfur dioxide. In some of its more specific aspects it relates to the production of fabricated forms of such resins. Preferred embodiments of the invention pertain to improvements in the plasticizing of polysulfone resins and the resulting plasticified products.

Sulfur dioxide and olefinic compounds, such as hydrocarbon olefins, are known to react in the presence of either actinic light or suitable catalysts to produce polysulfones of high molecular weight of resinous character. The solid material produced by the reaction may be molded into suitable shapes by the application of heat and pressure. Ordinarily this is accomplished by breaking up the solid resin into granules or powder and then fusing and molding same. The polysulfone resins may likewise be used in other applications where their resinous nature is useful. Such resins may be prepared either by subjecting a more or less anhydrous mass of liquid sulfur dioxide and olefin or olefins to reaction under resin-forming conditions, or the resinification reaction may be effected with the sulfur dioxide and the olefin in aqueous emulsion. Methods for carrying out the latter procedure are disclosed and claimed in the co-pending application, Serial No. 8,755, filed February 16, 1948. The physical characteristics of polysulfone resins depend considerably upon the particular olefin or olefins employed as starting material. The value of these resins and their field of usefulness is restricted by the brittleness of some of the resins, especially those prepared from the lower olefins, and by the fact that certain polysulfone resins are difficultly fusible while others decompose at temperatures in the range of or only slightly above the temperatures usually required in molding. The above mentioned characteristics present serious objections to the use of these resins for molding purposes and in the field of plastics generally.

The use of added materials as plasticizers is a common expedient in the plastics art, and most of the commonly available plastics are readily plasticified by a large number of different substances which counteract brittleness and give workability and flexibility to the resin composition. Among the well known plasticizers may be mentioned phthalate ethers and the organic phosphates. The selection of an effective plasticizer for a given resin is largely empirical, as there are few generalizations which can be made with respect to chemical structure of a resin and the chemical structure of materials which will plasticize such a resin. However, it may be stated that most resins are found to be plasticizible with a large variety of different types of organic compounds. A marked exception to this rule is found in the polysulfone resins, as attempts to modify these resins by the use of the usual plasticizers have been unsuccessful. One of the principal difficulties in the practical application of polysulfone resin lies in their difficulty of plasticization.

In the case of many olefins utilizable as starting material of polysulfone resins, the resulting polysulfones are sufficiently soluble in liquid sulfur dioxide to produce a viscous solution and, with sulfur dioxide abstraction, finally a vitreous mass. In many instances it is desirable to produce molded shapes in large molds with the application of little or no heat, and for such purposes it has been found possible to manipulate the resin while it contains free, i. e. chemically uncombined, sulfur dioxide. The liquid sulfur dioxide thus acts as a plasticizer for the polysulfone resin, enabling the handling of the resin in the initial stages of molding by virtue of imparting fluidity.

In general, polysulfone resins prepared by reacting sulfur dioxide with a straight chain olefin having at least four carbon atoms to the molecule are soluble in liquid $SO_2$.

When a polysulfone resin containing dissolved sulfur dioxide is formed into a given shape by molding and then exposed for a period of time to the air, a slow loss of dissolved sulfur dioxide takes place leading to the formation of cracks and the loss of strength and clearness of appearance. It is one purpose of my invention to effect the chemical binding of such sulfur dioxide and so reduce or prevent its physical loss with resultant loss in quality of molded objects.

This application is a continuation-in-part of my copending application Serial No. 430,294, filed February 10, 1942, now U. S. Patent 2,450,424, issued Oct. 5, 1948, wherein are disclosed certain methods of effecting such chemical binding of free sulfur dioxide and wherein one general method of accomplishing same is claimed.

While use of liquid sulfur dioxide as plasticizing medium for polysulfone resins is effective in the initial stages of molding, it will be apparent that upon removal of the sulfur dioxide either physically or chemically the resulting resin product will be in an unplasticized condition, with consequent possible brittleness, and resistance to further molding operation if required. The use of liquid sulfur dioxide for the purposes mentioned is likewise limited by the lack of compatibility of many of the polysulfone resins in sulfur dioxide, such as the polysulfone resin of isobutylene or propylene for example. It is thus seen that liquid sulfur dioxide is not uniformly applicable in all cases wherein plasticized polysulfone resins are desired.

An object of this invention is to provide improvements in the plasticizing of polysulfone resins, i. e. resins formed by the reaction of sulfur dioxide with an olefinic compound.

Another object of the invention is to provide improved molded polysulfone resin products which are properly plasticized.

Another object of the invention is to effect cohesion of polysulfone resin material under lower temperature conditions than are normally necessary for molding dry solid resins that are substantially free from chemically uncombined sulfur dioxide.

A further object is to complete the resin-forming reaction with consequent solidification in a space which impresses the desired shape to the molded object.

This invention has for a further object the production of solid resin in moldings of relatively large cross-section, while avoiding the difficulties of overheating the outer portions and underheating the inner portions of the material during molding procedure, as usually applied.

Yet another object of the present invention is to provide polysulfone resin products which will not shatter when broken under impact and which are in general less brittle than such products heretofore known.

A still further object of this invention is to lower the softening point of polysulfone resins.

Another object of the invention is to provide novel plasticizers for polysulfone resins which are chemically stable, or resistant to oxidation, and are non-corrosive to metals.

A further object is to provide lower molding temperature for polysulfone resins, and thus permit production of homogeneous moldings free of gas bubbles sometimes caused by thermal decomposition of the resin during molding at higher temperatures.

Yet another object is to enable the completion of a molding cycle in shorter period of time than that heretofore employed by providing a resin composition capable of being molded at relatively low temperatures.

Another object is to provide a polysulfone resin composition which is initially readily flowable into molds by virtue of the presence of a temporary plasticizing material and which finally is non-brittle by virtue of the presence therein of permanent plasticizing compositions.

Further objects and advantages of the invention will be apparent to one skilled in the art from the accompanying disclosure and discussion.

As will be apparent from the foregoing, my invention comprises several specific modifications which may be used alone or combined one with the other. In one method of practicing my invention I produce a mixture of polysulfone resin, plasticized by providing a suitable proportion of free sulfur dioxide. To this mixture of resin and chemically unreacted sulfur dioxide I add an unsaturated aliphatic monosulfone having an ethylenic linkage capable of reacting with the free sulfur dioxide; also added is catalyst for effecting reaction between the olefinic bond of the aliphatic sulfone and sulfur dioxide. The quantity of unsaturated sulfone thus added is at least sufficient to consume by chemical reaction the chemically unreacted sulfur dioxide present in the admixture. It is to be understood that for effecting the reaction between the unsaturated monosulfone and sulfur dioxide either actinic light or a suitable catalyst may be used. In this modification of my invention involving the use of liquid sulfur dioxide as plasticizing medium, the polysulfone resin employed is one prepared by reacting sulfur dioxide with a straight-chain olefin having at least four carbon atoms to the molecule. Of the simple hydrocarbon olefins, 1-butene and the 2-butenes (cis and trans) and straight-chain olefins of higher molecular weight, with few exceptions yield, upon reacting with sulfur dioxide, sulfone resins which are soluble in sulfur dioxide. 2-butene polysulfone dissolved in about five times its weight of sulfur dioxide produces a viscous honey-like liquid which thickens as the proportion of resin increases; at approximately 50 to 75 per cent of resin in solution with sulfur dioxide, the fluidity is slight, that is the plasticity of the mass is low, but the material may be masticated or kneaded readily. As the proportion of resin is increased to about 95 per cent complete hardness is approached. By masticating a sulfur dioxide-polysulfone mixture of suitable composition for mechanical working with an amount of unsaturated aliphatic sulfone at least equal to that required to consume all the sulfur dioxide by chemical reaction, largely by formation of polysulfone resins, together with a suitable catalyst for the reaction, a stable mixture may be produced ranging in fluidity or plasticity from a material which can be poured to one which can be forced by pressure into a mold. The material described, containing a catalyst, after being forced into a mold, is allowed to undergo reaction whereby the sulfur dioxide is consumed by reaction with the olefinic linkage of the added sulfone. The resulting molded product is free from chemically uncombined sulfur dioxide and hence free of the undesirable characteristics described above which are present in polysulfone resins containing any appreciable amount of free sulfur dioxide.

While I have stated above the polysulfone resins which are soluble in liquid sulfur dioxide are those prepared from $C_4$ and higher straight-chain olefins, other olefins, such as for example isobutylene, which yield resins not readily plasticized by sulfur dioxide, may be incorporated through copolymerization with one or more of the plasticizable species to produce polysulfone resins capable of sulfur dioxide plasticizing.

The unsaturated monosulfones used for reacting with free $SO_2$ have the advantages of possessing a marked degree of physical solubility in the resins. Accordingly, these soluble unsaturated monosulfones may be present in an amount either just sufficient or somewhat in excess of that needed to consume all of the free sulfur dioxide. In case such an excess is used, its presence in the finished molded product imparts a certain amount of plasticity thereto, thus reducing the brittleness and lowering the melting point of the resin composition. These unsaturated sulfones accordingly may be employed with a dual purpose, first to remove free sulfur dioxide which has been used for its temporary plasticizing effect in molding the resins and second to act itself as a permanent plasticizer for the resin. Suitable compounds for this purpose for example are organic sulfones containing an ethylenic group, such as methyl allyl sulfone, $$(CH_3-SO_2-CH_2CH=CH_2)$$

or methyl butenyl sulfone $$(CH_3-SO_2-CH_2CH_2CH=CH_2)$$

in which the double bond is preferably in the position most remote from the sulfone. At least one of the two organic groups attached to the $-SO_2-$group in the sulfone should have at least one ethylenic double bond. The other group may be the same or different, and need not necessarily be ethylenic, since phenyl or other aryl or aralkyl groups, or cycloalkyl groups, may be present. While in the examples mentioned the unsaturated group was alkenyl, unsaturated alicyclic radicals such as cyclohexenyl are suitable. Unsaturated sulfones containing nitrogen, sulfur, oxygen and halogen in many cases, I have found, show a marked solubility in the resin phase proper and the most suitable of these are readily found by trial.

In the use of a soluble unsaturated organic sulfone, according to one method of practicing my invention, it may be added at some stage in the resin-forming procedure above described, and may accompany a simple hydrocarbon olefin reactant, or be added after the resin-forming reaction is partially completed. The process may alternatively be carried out by admixing the unsaturated sulfone with resin and sulfur dioxide, after which resinification is allowed to complete itself, preferably during molding. In such as case the unsaturated monomeric sulfone is relied upon to consume all of the sulfur dioxide remaining with the resin from a polysulfone forming step, or sulfur dioxide which was added to a previously purified and dried resin for the purpose of imparting plasticity thereto. Lithium nitrate, or any of the many catalysts known to the art which are capable of catalyzing the formation of polysulfone resins from olefin and sulfur dioxide reactants will also be suitable for effecting a reaction between the added unsaturated monomeric sulfone and the chemically uncombined sulfur dioxide. Such catalyst may be added immediately prior to molding, or may be present in a resin-sulfur dioxide mixture in which it is acted to catalyze formation of the resin.

The proportion of chemically uncombined sulfur dioxide associated with the resin usually dictates the amount of unsaturated sulfone reactant required, and it may be 5 per cent or less if a resin molding material capable of being deformed or extruded at some temperature below dry molding temperature or decomposing temperature is desired. A mixture which can be handled as a fluid at ordinary or subatmospheric or moderately elevated temperature will ordinarily contain from 5 to 50 per cent of chemically uncombined sulfur dioxide.

Since sulfur dioxide and the simpler olefins are normally gaseous, special precautions may be required to avoid a change in composition which would lead on final resinification to a non-homogeneous molding. This ordinarily requires operating under high applied pressure, or in confined spaces which prevent the dispersion or evaporation of reactants, or operating at subatmospheric temperatures at which the vapor pressures of the reactants are low. These also may be resorted to to maintain the compositions of the mixtures prior to final resinification within the rather rigorous limits allowable, as taught in the foregoing description.

As indicated hereinabove use of a molecular excess of the unsaturated sulfone over the chemically uncombined sulfur dioxide produces a finished molded product which is plasticized by the presence of the residual monomeric sulfone. It is one feature of my invention that olefin-$SO_2$ polysulfone resins may be plasticized not only by unsaturated organic sulfones but by any of the monomeric organic sulfones. The polysulfone resins which are plasticized with organic sulfones in accordance with my invention may in general be prepared from any of the olefins, including the $C_4$ and higher straight-chain olefins which form resins soluble in liquid $SO_2$ and other olefins such as propylene and isobutylene, which form resins insoluble in liquid $SO_2$, or mixtures of various olefins. Usually the olefin reactants do not contain in excess of about 12 carbon atoms per molecule.

I have discovered that the organic sulfones, serve satisfactorily as plasticizers for olefin-sulfur dioxide polysulfone resins, which have heretofore been difficult or impossible to plasticize. These plasticizing materials include such aromatic sulfones as di-phenylsulfone and di-p-tolyl sulfone and their homologues, as well as mixed aromatic sulfones, preferably containing not over 16 carbon atoms per molecule. Of these, the sulfones with the lower molecular weight produce the best results and are therefore preferable. However, the higher molecular weight compounds do exhibit plasticizing properties and thus can be used. Also included in this invention are the alkyl sulfones, such as di-n-butyl and di-iso-butyl sulfones, and/or the higher homologues up to the compounds containing not over 14 carbon atoms per molecule. These also all exhibit satisfactory plasticizing properties but again the lower molecular weight sulfones of this series are preferred. Sulfones also showing suitable plasticizing effects on the sulfur dioxide-olefin resins are those sulfones having unlike hydrocarbon groupings, either in the alkyl or aryl series, in the same molecule e. g. phenyl tolyl sulfone, butyl phenyl sulfones, butyl hexyl sulfones, etc. Also a mixture of the sulfones can be used with satisfactory results. In place of one or both of the organic groupings of the sulfones which have been described above may be saturated alicyclic radicals such as cyclopentyl, cyclohexyl, methyl cyclohexyl and/or unsaturated alicyclic radicals such as methyl cyclopentenyl, cyclohexenyl and the like. Other sulfones usable for plasticizing in accordance with this invention are the alkenyl or other unsaturated sulfones as described hereinabove. As in the case of the unsaturated sulfones just mentioned, the other various sulfones mentioned herein as being composed of one or two hydrocarbon groups of various types may likewise be substituted with non-hydrocarbon groups such as those containing nitrogen, sulfur, oxygen or halogen. While the use of di-organo-monosulfones is preferred, similar disulfones which contain two-sulfone

groups in the molecule separated by one or more carbon atoms are also capable of plasticizing polysulfone resins in accordance with my invention.

The sulfone plasticizers described herein may be incorporated with the polysulfone resin in any suitable manner, either in an olefin-SO₂ resin-forming reaction mixture, or with a previously prepared solid polysulfone resin. Such a resin may be in granular form or ground to a powder and admixed with the plasticizer in any manner which will provide a sufficiently intimate admixture to give a homogeneous molded product. The resin and plasticizer may be molded together in heated form if desired.

The incorporation of my sulfone plasticizers with sulfur dioxide-olefin resins produces resins which soften at a lower temperature and thus permits a lower molding temperature than that of the unplasticized material. An advantage of this is that it permits the production of a homogeneous molding free of gas bubbles due to the lessened thermal decomposition of the resin at the lower molding temperature. Another advantage is a shorter molding cycle due to lesser requirements of heating and cooling the mold.

Contrary to most plasticizers which are liquids and when mixed with brittle resinous materials produce a softening effect as would be expected, the plasticizers herein described are solids, most of which have moderately high melting points and are brittle crystalline products. The fact that a brittle solid plasticizer and a brittle resin when fused together form a product which is less brittle is completely unexpected.

The quantity of plasticizer needed to obtain the desired improvement varies with the olefins used in the preparation of the resin and also with the methods employed. Thus polysulfones made from higher molecular weight olefins require a lesser amount than polysulfones made from ethylene and propylene. Similarly polysulfones of a lesser degree of polymerization require less plasticizer than those of a higher degree of polymerization. The composition of the plasticizer also affects the quantity of plasticizer needed. The most useful range is approximately from 0.5 per cent to 25 per cent, while the preferred range is generally from 1 to 15 per cent. The exact quantity to be used is readily determined by trial in any specific case. These are percentages of total product.

The following examples are presented to illustrate various aspects of the invention. It will be apparent of course that the invention is not limited in its broader scope by the specific proportions and materials used.

Example I

A mixture is prepared that consists of 80 parts by weight of 2-butene polysulfone resin, 0.05 part by weight of lithium nitrate, 20 parts by weight of sulfur dioxide, and an amount of methyl 3-butenyl sulfone ($CH_3$—$SO_2$—$CH_2CH_2CH$=$CH_2$) equal to 105 mole per cent of the sulfur dioxide. The mixture is kneaded until thoroughly homogenized and transferred to a vessel or mold wherein reaction goes to completion without further agitation.

Example II

Five parts of n-butyl sulfone was added to one hundred parts by weight of a copolymerized mixture of sulfur dioxide-olefin resin, in which the olefins used were propylene, butene-2, and butene-1, in the proportions 50 per cent, 33 per cent, and 17 per cent, respectively. The mixture was thoroughly mixed and ground in a ball mill for ten hours and then dried at 80° overnight. A five gram sample was molded in a one-inch mold at 155–160° C., under a pressure of 2200 pounds per square inch. This plasticized resin softened at 115–120°. The resultant molding was completely fused and did not shatter when broken under impact. The beneficial effect obtained by the use of n-butyl sulfone as a plasticizer may be seen by comparison with the molding of the unplasticized resin. The same resin unplasticized, when molded under identical conditions, softened at a temperature of 140–150° C. The resultant molding was completely fused and transparent. Upon being broken by impact the molded button of unplasticized resin shattered into a large number of small pieces, thus demonstrating the brittle nature of the unplasticized resin.

Example III

Five parts of diphenyl sulfone was mixed and ground with one hundred parts by weight of the polysulfone resin described in Example II above. After drying at 80° C. the resin was molded at 160° C. The resin began to soften at 135–140° C. This molded button also did not shatter when broken. A similar molding containing only 2.5 parts of diphenyl sulfone showed less improvement in resistance to shattering, which is an indication of the fact that this property can be controlled over a wide range by varying the proportion of plasticizer.

While the invention has been described in detail with specific examples, such examples are merely illustrative and are not given as limitations, since other modifications within the spirit and scope of the invention will be apparent to those skilled in the art. Hence, the invention is to be understood as limited only as indicated in the appended claims in which the intent is to set forth all the novelty over the prior art.

I claim:

1. The process of producing a molded product comprising a reaction product of sulfur dioxide and a straight chain olefin having at least four carbon atoms to the molecule which forms with sulfur dioxide a resinous product that is normally soluble in sulfur dioxide, which comprises reacting such an olefin with sulfur dioxide in molecular excess in the presence of a catalyst for promoting the reaction of said olefin with sulfur dioxide until a resinous mass plastic at room temperature and which contains plasticizing amounts of chemically uncombined sulfur dioxide is formed, admixing at least sufficient monomeric alkenyl sulfone to react with said chemically uncombined sulfur dioxide with the reaction mixture at a time prior to the molding step hereinafter described, and thereafter transferring said resinous mass to a mold and subjecting it to molding conditions effecting the setting thereof and the chemical combination of said uncombined sulfur dioxide.

2. The process of producing a molded product comprising a reaction product of sulfur dioxide and 2-butene, which comprises reacting 2-butene with sulfur dioxide in molecular excess in the presence of lithium nitrate until a resinous mass plastic at room temperature and which contains plasticizing amounts of chemically uncombined sulfur dioxide is formed, admixing at least sufficient monomeric unsaturated sulfone to react with said chemically uncombined sulfur dioxide with the reaction mixture at a time prior to the molding step hereinafter described, and thereafter transferring said resinous mass to a mold and subjecting it to molding conditions effecting the setting thereof and the chemical combination of said uncombined sulfur dioxide.

3. The process of producing a molded product comprising a resinous reaction product of sulfur dioxide and a straight chain olefin having at least four carbon atoms to the molecule which forms with sulfur dioxide a resinous product that is normally soluble in sulfur dioxide, which comprises forming an admixture of such a resinous product with (a) sulfur dioxide in an amount sufficient to yield a mass that is substantially plastic at room temperature and (b) a monomeric unsaturated sulfone reactive with sulfur dioxide in an amount at least sufficient to combine with the sulfur dioxide, and (c) a catalyst for promoting the reaction of said sulfone with sulfur dioxide, and thereafter subjecting said mass to molding at conditions effecting the setting thereof.

4. A process according to claim 3 wherein sulfur dioxide is present in the proportion of from about 5 to 50 weight per cent of the total admixture.

5. A process according to claim 3 wherein said sulfone contains at least one alkenyl group.

6. A process according to claim 3 wherein the added sulfone reacted with sulfur dioxide is a methyl butenyl sulfone.

7. A process according to claim 6 wherein the resinous product is the reaction product of sulfur dioxide and 2-butene.

8. A process according to claim 3 wherein said monomeric sulfone is used in sufficient excess over the amount required to combine with the sulfur dioxide to leave plasticizing amounts of unreacted sulfone present in the finished molded product.

9. A process according to claim 8 wherein said sulfone is a monoalkenyl sulfone containing not over 14 carbon atoms per molecule.

10. An improved monoolefin-$SO_2$ polysulfone resin composition containing plasticizing amounts of a monomeric organic sulfone.

11. A composition according to claim 10 wherein said sulfone is an aryl sulfone having not in excess of 16 carbon atoms per molecule.

12. A composition according to claim 10 wherein said sulfone is an alkyl sulfone having not in excess of 14 carbon atoms per molecule.

13. A plasticized composition comprising polymeric polysulfone resin and sufficient solid monomeric hydrocarbon sulfone to reduce the molding temperature and brittleness of the resin.

14. A composition according to claim 13 containing from 1 to 15 weight per cent sulfone.

15. A composition according to claim 10 wherein said sulfone is a monomeric unsaturated sulfone containing an ethylenic double bond.

16. A composition according to claim 10 wherein said sulfone is di-n-butyl sulfone.

17. A plasticized composition comprising (a) a resinous reaction product of sulfur dioxide and a monoolefin hydrocarbon containing not in excess of 12 carbon atoms per molecule, and (b) plasticizing amounts of a monomeric organic sulfone.

18. A composition according to claim 17 wherein (a) is a resinous reaction product of sulfur dioxide and a mixture of propylene, butene-2 and butene-1.

19. A composition according to claim 10 wherein said sulfone is diphenyl sulfone.

FREDERICK E. FREY.

REFERENCES CITED

The following references are of record in the file of this patent:

UNITED STATES PATENTS

| Number | Name | Date |
| --- | --- | --- |
| 2,127,400 | Gibbs | Aug. 16, 1938 |
| 2,201,544 | Marvel et al. | May 21, 1940 |
| 2,450,424 | Frey | Oct. 5, 1948 |